United States Patent Office 3,329,736
Patented July 4, 1967

3,329,736
CATALYTIC ISOMERIZATION OF OLEFINS
Walter A. Butte, Jr., West Chester, and Israel Wistar Morris III, Ithan, Pa., assignors to Sun Oil Company, Philadelphia, Pa., a corporation of New Jersey
No Drawing. Filed Sept. 2, 1965, Ser. No. 484,730
12 Claims. (Cl. 260—683.2)

This invention pertains to the catalytic isomerization of olefins, and particularly to the conversion of 1-olefins to 2-olefins with good yields which in many cases are close to quantitative. The invention pertains more particularly to the use of a catalyst system which exhibits a high degree of specificity for the purpose. The invention also pertains to a catalyst system which is new per se.

For purposes of the specification and the claims the term 1-olefin or its equivalent is intended to define a monoolefin or a diolefin having a double bond in the 1-position in a hydrocarbon chain; in the case of a diolefin, with the second double bond in other than the conjugated or 3-position. Likewise, the term 2-olefin or its equivalent is intended to define a monoolefin or a diolefin having a double bond in the 2-position in a hydrocarbon chain, in the case of a diolefin, irrespective of the position of the other double bond.

The importance of the specificity of catalysts in the isomerization of 1-olefins to 2-olefins cannot be over-emphasized for apart from the desired shift of the double bond, and any interconversion of cis and trans isomers that may be involved, many other types of reaction including isomerizations are possible, as is well known. Moreover, the isomerization reactions of the invention yield a surprisingly high percentage of cis-isomers which is unusual.

Among the advantages exhibited by the catalyst system employed herein in the above-mentioned desired isomerizations in addition to its high degree of specificity, are its high solubility in hydrocarbons which (1) permits the use of higher effective catalyst concentrations; (2) results in faster conversions since high hydrocarbon concentrations can be used; and (3) the hydrocarbons themselves may serve as the reaction medium, thus minimizing separation problems.

The catalyst system employed in effecting the desired isomerizations results from combining an N-lithio amide with a coordinating non-aromatic tertiary amine selected from the group consisting of bridgehead amines and chelating diamines. Examples of preferred coordinating amines are N,N,N',N'-tetramethylene diamine and sparteine.

The N-lithio amide may be derived from any desired source and/or in any desired manner presently known or otherwise. It may be formed previously or in situ. A typical reaction is illustrated by an equation as follows which shows the interaction of a primary or secondary amine with a hydrocarbolithium compound:

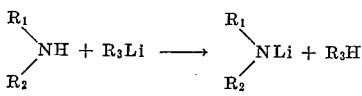

in which $R_1$ is one of a group consisting of an alkyl radical of one to twenty carbon atoms, an alkenyl radical of one to twenty carbon atoms, and hydrogen; in which $R_2$ is one of a group consisting of an alkyl radical of one to twenty carbon atoms, an alkenyl radical of one to twenty carbon atoms, and an alicyclic hydrocarbon radical of three to ten carbon atoms; and in which $R_1$ and $R_2$ considered jointly comprise a polymethylene radical of from four to ten carbon atoms having its ends joined to the N atom shown to form therewith a ring, and in which $R_3$ is a hydrocarbon radical of one to twenty carbon atoms from the group consisting of alkyl, aralkyl, aryl, alkaryl alkenyl, and alicyclic hydrocarbon radicals.

A typical catalyst product resulting from the combination of an N-lithio amide and N,N,N',N'-tetramethylethylene diamine is believed to be illustrated by the following equation:

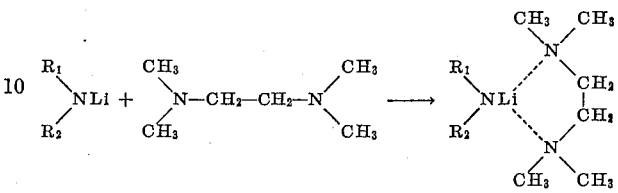

Instability of the catalyst product, however, seriously interferes with isolation and exact analysis.

Examples of alkyl radicals are methyl, ethyl, propyl, butyl, pentyl, hexyl, heptyl, octyl, nonyl, decyl, undecyl, dodecyl, etc. up to and including eicosyl, and the various isomers of the foregoing.

Examples of alkenyl radicals are ethenyl, propenyl, butenyl, pentenyl, hexenyl, heptenyl, octenyl, nonenyl, decenyl, undecenyl, dodecenyl, etc., up to and including eicosenyl, and the various isomers of the foregoing.

Examples of alicyclic hydrocarbon radicals are cyclopropyl, cyclobutyl, cyclopentyl, cyclohexyl, cycloheptyl, cyclooctyl, cylononyl, cyclodecyl, the corresponding olefins and diolefins, and alkyl derivatives of the foregoing.

Examples of polymethylene radicals are tetramethylene ($-CH_2CH_2CH_2CH_2-$), pentamethylene $$-CH_2CH_2CH_2CH_2CH_2-$$

hexamethylene, heptamethylene, octamethylene, nonamethylene and decamethylene.

The following are examples of suitable $R_3$ groups for the $R_3Li$ component: ethyl, propyl, isopropyl, n-butyl, isobutyl, tertiary butyl, n-amyl, isoamyl, n- or isooctyl, n- or isodecyl, lauryl, cyclopentyl, methylcylohexyl, phenyl, benzyl, tolyl, xylyl, cumyl, methylbenzyl, propylbenzyl, 2-phenylethyl, allyl, crotonyl and the like. Preferably $R_3Li$ is an alkyl lithium in which the alkyl group has 2–10 carbon atoms.

An outstanding feature of the invention is that the catalyst may be formed in situ in the reaction zone, in the presence or absence of the olefin to be isomerized, by adding the non-tertiary amine, the hydrocarbo-lithium, and the coordinating tertiary amine in any desired order, in which case $R_3H$ of the first-mentioned equation either acts primarily as a diluent or is a gaseous hydrocarbon which escapes.

N-lithio amides in which each of $R_1$ and $R_2$ is an alkyl radical of from one to five carbon atoms, or considered jointly comprise a polymethylene radical, are preferred.

Typical amines for reaction with the hydrocarbolithium compound in the formation of N-lithio amides highly useful in the preparation of the new catalysts to which the invention relates are dimethylamine, diethylamine, dipropylamine, dibutylamine, piperidene, and propyl and butyl isomers of the foregoing.

As to the coordinating amine best results generally are obtained with chelating diamines; i.e., diamines in which the two nitrogen atoms are so spaced in the molecule that the diamine can form a chelate with the lithium component of the catalyst. These chelating amines can be of either of two sub-types depending upon whether the molecular structure is flexible or rigid. Examples of the flexible sub-type are as follows: N,N,N',N'-tetramethylethylene diamine and N,N,N',N'-tetrapropylethylene diamine. The following are examples of the rigid sub-type in which the nitrogen atoms are so positioned with respect to each other that metal chelates can readily be formed in spite of the lack of flexibility in the molecular structure:

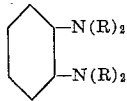

N,N,N',N'-tetraalkyl-1,2-diaminocyclohexane

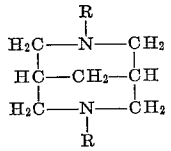

N,N'-dialkylbispidin

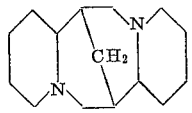

sparteine

Another preferred type of amine for use in practicing the invention comprises amines in which one or more of the nitrogen atoms are at a bridgehead position, by which is meant that all three valences of the nitrogen participate in ring systems. The preferred amine of this type is triethylenediamine, which also can be designated 1,4-diaza-[2.2.2]bicyclooctane, which has the following structure:

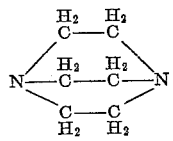

These bridgehead type amines are non-chelating but nevertheless form coordination complexes with the LiR component that have good catalytic activity and stability. Another amine of the bridgehead type is quinuclidine or 1,4-ethylenepiperidine, which has a structure like the foregoing except that one of the nitrogen atoms is replaced by a CH group. Still other examples are the aza-adamantanes which structurally resemble adamantane except that one or more nitrogen atoms are substituted at bridgehead positions in place of carbon.

In accordance with the invention 2-olefins are prepared by contacting 1-olefins, as above defined, with a catalyst system as above described, contact taking place at a temperature insufficiently high to decompose the catalyst or reactants, e.g., in the range of 0–200° C. and preferably 50–150° C. Contact preferably takes place in a closed system. Pressure may be employed if desired to maintain the reactants, e.g., the 1-olefin if relatively low boiling, in appropriate concentration in the liquid phase.

Catalyst concentrations in the reaction zone may vary widely and as desired, e.g., from 0.1% to 10% by weight of the reaction zone contents.

The catalyst system may be formed in situ in the presence of the 1-olefin to be isomerized, or it may be preformed. The reaction may take place, if desired, in the presence of an inert solvent, of which the saturated liquid hydrocarbons of either paraffinic or naphthenic structure are examples. But as brought out above, an outstanding advantage of the invention is that a homogeneous reaction is afforded without the use of an inert solvent medium. The catalyst components when admixed form coordination compounds which act as catalysts in the isomerization reaction. Pre-forming of the catalyst system may take place in the presence of an inert solvent, such as those mentioned above, if desired. Also one or more of the components used in the production of the catalyst system, e.g., the hydrocarbo-lithium component, may be added to the reaction zone in solution in an inert solvent, if desired.

In the formation of the catalyst system, the reactants combine stoichiometrically. It is found, however, that excess diamine has a strong activating or accelerating effect in the isomerization reaction, and its presence is highly preferred. Excess hydrocarbolithium is somewhat borderline in that it appears to have a slight accelerating effect when present in low excess concentration and a slight reverse effect when present in high concentration.

In carrying out any of the foregoing reactions precautions ought to be taken to exclude air and moisture from the system to avoid poisoning the catalyst.

The isomerization reaction may be carried out in batch, intermittently or continuously as desired.

The 1-olefin, if in the liquid phase, may be added to the reactor, such as an autoclave, in a single charge along with the catalyst ingredients. If in either the liquid phase or in the vapor phase, the olefin can be added to the reactor continuously, or intermittently as it is consumed, if desired. In the case of vapor phase olefins sufficient pressure is preferably applied to maintain the 1-olefin concentration in the liquid phase reaction system at a suitable level for a practical isomerization rate.

After the reaction has proceeded to a desired extent, the catalyst system can be deactivated by contacting the reaction mass with water and/or a lower molecular weight aliphatic monohydric alcohol, e.g., methyl alcohol, whereupon the catalyst degradation products may be removed from the hydrocarbon component by extraction with water, or in any other desired manner. The product may be recovered by distillation or otherwise.

The following examples illustrate the invention more specifically.

*Example 1*

Eighty parts by volume of octene-1, 14 parts by volume of a 1.5 molar solution of butyl lithium in hexane, 4 parts by volume of N,N,N',N'-tetramethylethylene diamine, and 2 parts by volume of diethylamine were charged to a closed reactor placed in a thermostated bath held at 60° C. The reaction mass was continually agitated. Aliquot portions were removed periodically and analyzed. Percentages of 2-olefins obtained at various elapsed time intervals, based on feed olefin, were as follows:

| Elapsed Minutes | Octene-1 | Cis-2 | Trans-2 |
|---|---|---|---|
| 60 | 86.7 | 5.5 | 7.7 |
| 120 | 79.3 | 9.5 | 11.1 |
| 240 | 67.2 | 16.0 | 16.8 |
| 360 | 55.6 | 22.2 | 22.2 |
| 1,440 | 15.7 | 42.0 | 42.3 |

*Example 2*

This example is substantially identical to that of Example 1, except that piperidene was substituted for diethylamine. Percentages of 2-olefins obtained at various elapsed time intervals, based on feed olefin, were as follows:

| Elapsed Minutes | Octene-1 | Cis-2 | Trans-2 |
|---|---|---|---|
| 60 | 73.4 | 16.5 | 10.2 |
| 120 | 56.0 | 28.4 | 15.5 |
| 240 | 33.7 | 43.4 | 22.8 |
| 340 | 22.5 | 50.7 | 26.8 |
| 1,320 | 4.4 | 56.0 | 39.8 |

Example 3

This example is in all respects similar to that of Example 1, except that the temperature of the bath was raised to 100° C., with results as follows:

| Elapsed Minutes | Octene-1 | Cis-2 | Trans-2 |
|---|---|---|---|
| 10 | 86.6 | 5.6 | 7.9 |
| 20 | 79.0 | 9.8 | 11.3 |
| 40 | 64.3 | 17.1 | 18.4 |
| 60 | 53.6 | 22.9 | 24.0 |
| 120 | 35.3 | 31.6 | 32.9 |
| 1,065 | 6.2 | 34.8 | 58.6 |

Example 4

Eighty-six parts by volume of 4-phenylbutene-1, 9 parts by volume of a 1.5 molar solution of butyl lithium in hexane, 2 parts by volume of N,N,N',N'-tetramethylethylene diamine, and 3 parts by volume of diethylamine were charged to a closed reactor provided with an agitator and placed in a thermostated bath held at 60° C. The reaction mass was continually agitated. Aliquot portions were removed periodically and analyzed. Percentages of products obtained at various elapsed time intervals, based on feed olefin, were as follows:

| Elapsed Minutes | 4-phenylbutene-1 | 1-phenylbutene-2 | 1-phenylbutene-1 |
|---|---|---|---|
| 30 | 84.3 | 5.2 | 10.7 |
| 60 | 74.0 | 5.8 | 20.0 |
| 120 | 55.0 | 7.5 | 38.0 |
| 240 | 35.1 | 8.5 | 57.0 |
| 1,320 | 9.8 | 9.1 | 81.3 |
| 4,800 | 8.2 | 10.7 | 82.0 |

Example 5

Eighty parts by volume of 4-vinylcyclohexene-1, 14 parts by volume of a 1.5 molar solution of butyl lithium in hexane, 4 parts by volume of N,N,N',N'-tetramethylene diamine, and 2 parts by volume of diethylamine were charged to a closed reactor placed in a thermostated bath held at 100° C. The reaction mass was continually agitated. Aliquot portions were removed periodically and analyzed. Percentages of products obtained at various elapsed time intervals based on feed olefin, were as follows:

| Elapsed Minutes | 4-vinylcyclohexene-1 | 3-ethylidene-cyclohexene-1 | Ethyl benzene |
|---|---|---|---|
| 40 | 88.1 | 9.7 | 3.0 |
| 100 | 80.4 | 15.6 | 4.1 |
| 200 | 71.3 | 21.9 | 7.0 |
| 1,190 | 41.4 | 35.3 | 20.0 |
| 2,640 | 33.3 | 35.0 | 24.6 |

Example 6

Sixty parts by volume of hexadiene-1,5; 30 parts by volume of a 1.5 molar solution of butyl lithium in hexane, 6 parts by volume of N,N,N',N'-tetramethylene diamine, and 4 parts by volume of diethylamine were charged to a closed reactor placed in a thermostated bath held at 60° C. The reaction mass was continually agitated. Aliquot portions were removed periodically and analyzed. Percentages of products obtained at various elapsed time intervals, based on feed olefin, were as follows:

| Elapsed Minutes | Hexadiene-1,5 | Hexadiene-2,4 | Other Products |
|---|---|---|---|
| 120 | 43.1 | 34.4 | 22.6 |
| 300 | 15.6 | 53.2 | 31.2 |
| 1,440 | 2.2 | 57.5 | 40.3 |

Example 7

This example is substantially identical to that of Example 1, except that sparteine was substituted for N,N,N',N'-tetramethylethylene diamine. Percentages of 2-olefins obtained at elapsed time intervals, based on feed olefin, were as follows:

| Elapsed Minutes | Octene-1 | Cis-2 | Trans-2 |
|---|---|---|---|
| 300 | 90.9 | 6.2 | 3.2 |
| 1,320 | 72.3 | 15.0 | 12.7 |

The isomerization reaction of the invention may be very materially speeded up by raising the reaction temperature. This is demonstrated upon comparing Example 1 with Example 3. In these two examples all conditions were the same, except that in Example 1 the reaction temperature was 60° C., whereas in Example 3 the reaction temperature was 100° C.

By way of comparison, it will be noted in Example 1 that after a lapse of 240 minutes, the 2-olefin yield totaled 32.8 percent, whereas in Example 3, after a lapse of only 40 minutes, the 2-olefin yield totaled 35.5 percent, showing a difference in reaction rate of the order of six-fold.

The foregoing examples also demonstrate various other features of the invention.

For instance, it will be noted that not only was the catalyst system formed in situ, that is in the presence of the 1-olefin isomerized, but also that the N-lithio amide component of the catalyst system was formed in situ.

Also it will be noted that the ratio of cis-2-olefin to trans-2-olefin varies as the reaction proceeds. Thus if a high yield of the cis-2-olefin is desired, the reaction may be stopped when it is present in high ratio, and after its separation from the reaction mass, the rest of the reaction mass, with or without prior separation of the trans-2-olefin, may be recycled. The same applies when a high yield of trans-2-olefin is desired.

The same technique may be applied in those instances where products other than 2-olefins are produced.

From the foregoing it can be seen that terminal olefins are converted to 2-olefins in relatively high yield and largely without inordinately large conversion to other olefins or other products. Moreover the yield of cis-2-olefins is relatively high.

Many other examples could be given illustrating the substitution of reactants in the above examples.

Olefins that may be isomerized in accordance with the invention include open chain structures, e.g. $RR'=CH_2$ wherein R is one of the group consisting of alkyl, alkenyl, cycloalkyl, cycloalkenyl, and aralkyl radicals, wherein R' is one of said last-mentioned group or hydrogen, and wherein neither R nor R' contains a double bond in conjugated position relative to the 1-olefin double bond shown. Examples of such radicals are listed above under the discussion of $R_1$, $R_2$ and $R_3$.

2-olefins have a variety of uses. The monoolefins are valuable as additives to motor fuels to increase performance properties. 2-olefins find desirable uses in alkylation processess for improving the anti-knock properties of motor fuels, particularly by way of side chain production. They are also useful in the production of the corresponding halides by halogenation and hydrohalogenation, as well as other desirable derivatives by addition at the double bond or bonds.

It is to be particularly noted that in the coordination combinations of the invention, the lithium atom is bound to a nitrogen atom, namely, that of the N-lithio amide. It follows that the catalyst system of the invention is fundamentally different from the catalyst system described in the Journal of Organic Chemistry, 29,2928 (1964) in an article entitled "A Catalytic Telomerization Reaction of Ethylene with Aromatic Hydrocarbons," for in the latter the lithium atom is bound to a carbon atom, the catalyst system being a combination of a non-aromatic tertiary amine with LiR wherein R is a hydrocarbon radical.

In the present invention, on the other hand, the catalyst system is comprised of a combination of a non-aromatic tertiary amine selected from the group consisting of bridgehead amines and chelating diamines with

wherein $R_1$ and $R_2$ are as defined above.

The N-lithio amides are, generally speaking, insoluble in non-polar hydrocarbon media, but are solubilized by the tertiary amine to form the catalyst system combination by coordination. When forming the N-lithio amide in situ in the reaction zone, it is recommended that excess non-tertiary amine beyond that required for stoichiometric reaction with the hydrocarbo-lithium be avoided for its presence in the isomerization reaction zone in unreacted state appears to have an inhibiting effect.

Having particularly described the invention, it is to be understood that this is by way of illustration and not of limitation, and that changes, omissions, additions, substitutions and/or other modifications may be made without departing from the spirit thereof. Accordingly it is intended that the patent shall cover, by suitable expression in the claims, the various features of patentable novelty that reside in the invention.

We claim:

1. A method for the production of 2-olefins from 1-olefins as herein defined by isomerization which comprises contacting 1-olefin with a catalyst system which is a combination of a non-aromatic tertiary amine selected from the group consisting of bridgehead amines and chelating diamines with an N-lithio amide having the formula

in which $R_1$ is one of a group consisting of an alkyl radical of one to twenty carbon atoms, an alkenyl radical of one to twenty carbon atoms, and hydrogen; in which $R_2$ is one of a group consisting of an alkyl radical of one to twenty carbon atoms, an alkenyl radical of one to twenty carbon atoms, and an alicyclic hydrocarbon radical of three to ten carbon atoms; and in which $R_1$ and $R_2$ considered jointly comprise a polymethylene radical of from four to ten carbon atoms having its ends joined to the N atom shown to form a ring.

2. Method according to claim 1 wherein the reaction temperature is maintained in the range of 0–200° C.

3. Method according to claim 2 wherein the reaction temperature is maintained in the range of 50–150° C.

4. Method according to claim 1 wherein $R_1$ and $R_2$ are each an alkyl radical of one to five carbon atoms or considered jointly a polymethylene radical.

5. Method according to claim 4 wherein $R_1$ and $R_2$ considered jointly represent one of a group consisting of dimethyl, diethyl, dipropyl, diisopropyl and piperidene.

6. Method according to claim 1 wherein the 1-olefin is an aliphatic hydrocarbon.

7. Method according to claim 6 wherein the 1-olefin is a monoolefin.

8. Method according to claim 1 wherein the non-aromatic tertiary amine is N,N,N',N'-tetramethylethylene diamine.

9. Method according to claim 8 wherein the non-aromatic tertiary amine is present in excess in the reaction zone.

10. Method according to claim 1 wherein the non-aromatic tertiary amine is sparteine.

11. A catalyst system comprised of a combination of a non-aromatic tertiary amine selected from the group consisting of brideghead amines and chelating diamines with an N-lithio amide having the formula

in which $R_1$ is one of a group consisting of an alkyl radical of one to twenty carbon atoms, an alkenyl radical of one to twenty carbon atoms, and hydrogen; in which $R_2$ is one of a group consisting of an alkyl radical of one to twenty carbon atoms, an alkenyl radical of one to twenty carbon atoms, and an alicyclic hydrocarbon radical of three to ten carbon atoms; and in which $R_1$ and $R_2$ considered jointly comprise a polymethylene radical of from four to ten carbon atoms having its ends joined to the N atom shown to form therewith a ring.

12. A catalyst system according to claim 11 wherein the non-aromatic tertiary amine is N,N,N',N'-tetramethylethylene diamine.

References Cited

UNITED STATES PATENTS 3,201,493  8/1965  Meisinger et al. ____ 260—683.2
3,213,155  10/1965  Schriesheim et al. __ 260—683.2

DELBERT E. GANTZ, *Primary Examiner.*

R. H. SHUBERT, *Assistant Examiner.*